(12) United States Patent
Nozaki (10) Patent No.: US 7,712,562 B2
(45) Date of Patent: May 11, 2010

(54) INTAKE STRUCTURE OF VEHICLE

(75) Inventor: Naoki Nozaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 835 days.

(21) Appl. No.: 11/510,628

(22) Filed: Aug. 28, 2006

(65) Prior Publication Data
US 2007/0045029 A1 Mar. 1, 2007

(30) Foreign Application Priority Data
Aug. 31, 2005 (JP) ............................. 2005-252820

(51) Int. Cl.
*B60K 13/02* (2006.01)
(52) U.S. Cl. .................................................. 180/68.3
(58) Field of Classification Search ....... 180/68.1–68.3, 180/219, 309, 605.1, 908, 251, 233, 357
See application file for complete search history.

(56) References Cited

U.S. PATENT DOCUMENTS

| | | | | |
|---|---|---|---|---|
| 2,227,927 | A * | 1/1941 | Downs William T ............. | 62/7 |
| 4,189,020 | A * | 2/1980 | Abels et al. ................. | 180/68.1 |
| 4,508,189 | A * | 4/1985 | Kato ........................... | 180/219 |
| 4,531,928 | A * | 7/1985 | Ikenoya ........................ | 474/93 |
| 5,086,858 | A * | 2/1992 | Mizuta et al. .............. | 180/68.3 |
| 5,251,713 | A * | 10/1993 | Enokimoto ................ | 180/68.4 |
| 6,216,809 | B1 * | 4/2001 | Etou et al. ................. | 180/68.3 |
| 6,394,555 | B2 * | 5/2002 | Mizuta et al. ................. | 298/38 |
| 6,537,338 | B2 * | 3/2003 | Inoue et al. ................. | 55/385.3 |
| 6,565,620 | B1 * | 5/2003 | Greeson ..................... | 55/385.3 |
| 6,615,945 | B2 * | 9/2003 | Minami et al. .............. | 180/219 |
| 6,776,250 | B2 * | 8/2004 | Kuji et al. ................... | 180/68.3 |
| 6,892,842 | B2 * | 5/2005 | Bouffard et al. ........... | 180/68.3 |
| 7,168,516 | B2 * | 1/2007 | Nozaki et al. .............. | 180/68.3 |
| 7,284,629 | B2 * | 10/2007 | Nakano et al. ............. | 180/68.3 |
| 7,357,211 | B2 * | 4/2008 | Inui ........................... | 180/266 |
| 7,363,999 | B2 * | 4/2008 | Hastings ..................... | 180/220 |
| 7,441,619 | B2 * | 10/2008 | Hatakeyama .............. | 180/68.3 |
| 2001/0054832 | A1 * | 12/2001 | Mizuta ....................... | 296/205 |
| 2006/0272873 | A1 * | 12/2006 | Isoda et al. ................ | 180/68.3 |

FOREIGN PATENT DOCUMENTS

JP 7-7267 Y2 2/1995

* cited by examiner

*Primary Examiner*—Lesley Morris
*Assistant Examiner*—Vaughn T Coolman
(74) *Attorney, Agent, or Firm*—Birch, Stewart, Kolasch & Birch LLP (57) ABSTRACT

The present invention shortens an intake duct while enabling an intake of cleaner air into the inside of an air cleaner. In a vehicle in which vehicle body mounting parts such as an engine, an air cleaner and the like are supported on a vehicle body frame, a cabin is formed by mounting a pair of left and right seats on the vehicle body frame with the engine being arranged below the seats. An air cleaner is arranged behind the engine with an intake duct for sucking outside air being connected to the air cleaner. The intake duct extends frontwardly from the air cleaner while avoiding a cylinder portion of the engine with a distal end portion thereof being opened in a cabin side adjacent to the at least one seat.

20 Claims, 7 Drawing Sheets

INTAKE STRUCTURE OF VEHICLE

CROSS-REFERENCE TO RELATED APPLICATIONS

The present application claims priority under 35 USC 119 to Japanese Patent Application No. 2005-252820 filed on Aug. 31, 2005 the entire contents of which are hereby incorporated by reference.

BACKGROUND OF THE INVENTION

1. Field of the Invention

The present invention relates to an improvement of an intake structure of a vehicle.

2. Description of Background Art

As a conventional intake structure of a vehicle, there has been known an intake structure in which a pipe-shaped frame that is mounted behind a driver's seat is connected to an air cleaner as an intake duct JP-UM-B-7-7267.

Figure 3:
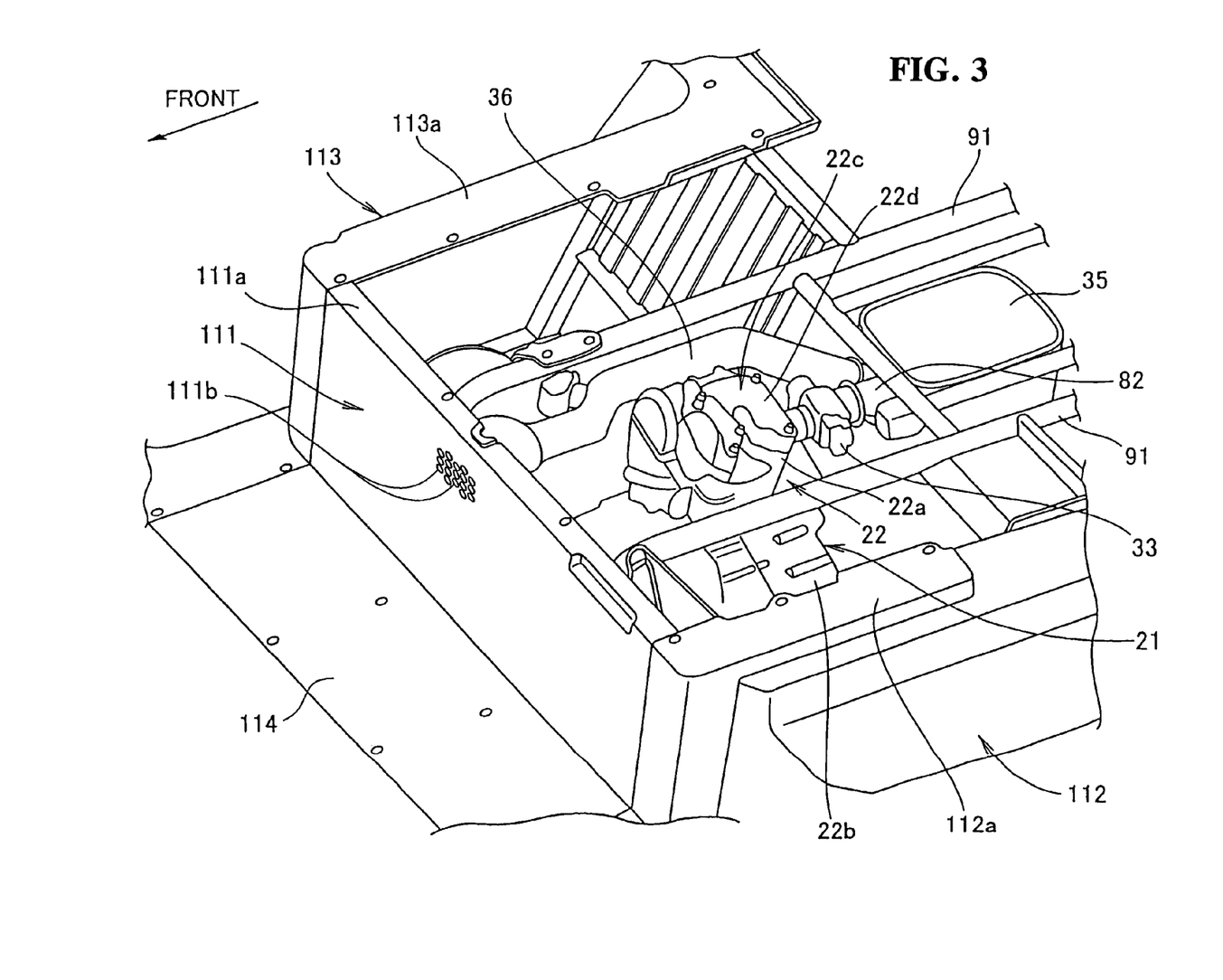
FIG. 3 is a perspective view of an essential part of the vehicle according to the present invention.
Figure 6A:
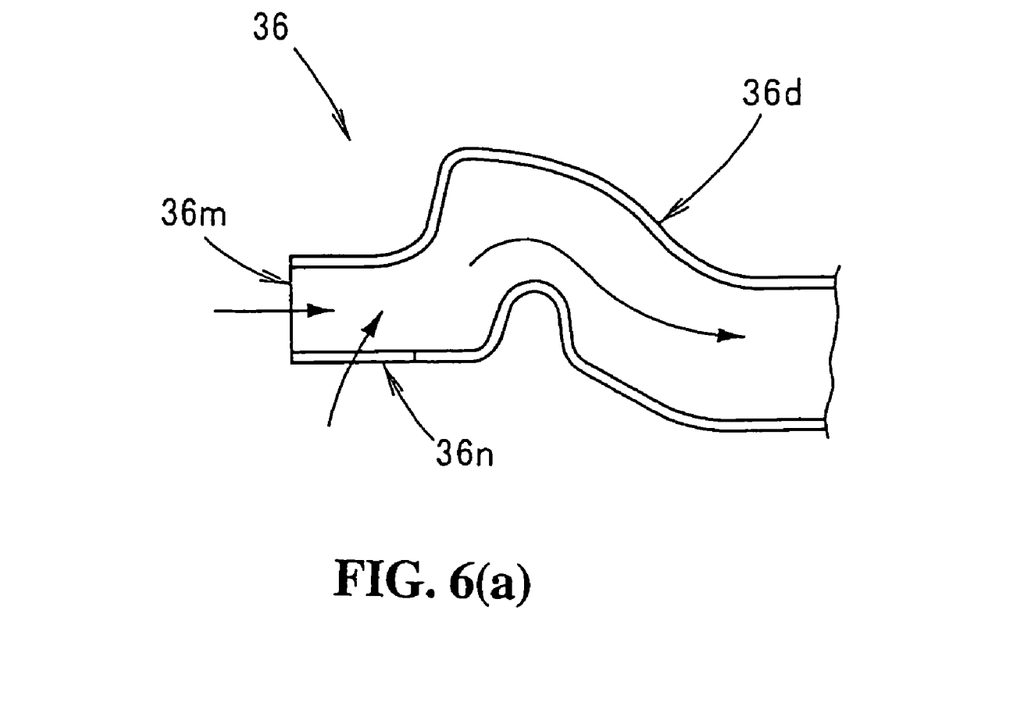
FIGS. 6(a) and 6(b) are operational views showing an operation of the water stop structure of the intake duct according to the present invention.

In FIG. 3 of JP-UM-B-7-7267, a hollow frame 10 which extends vertically is provided behind a driver's seat 6 with an air intake port being formed in an upper portion of the hollow frame 10. A lower end of the hollow frame 10 is connected to an air cleaner 25 by way of a connection pipe 28 and the air cleaner 25 is connected to an engine 8 side. Further, in FIG. 6 of JP-UM-B-7-7267, two air intake ports 32a, 32a are shown.

The hollow frame 10 which constitutes the intake duct extends to a high position. Thus, although the hollow frame 10 hardly sucks dust which is whirled in traveling, there has been a drawback in that a distance of the hollow frame 10 between the air intake ports 32a and the air cleaner 25 is elongated.

SUMMARY AND OBJECTS OF THE INVENTION

It is an object of the present invention to shorten an intake duct while enabling an intake of cleaner air into the inside of an air cleaner.

According to an embodiment of the present invention, in a vehicle in which vehicle body mounting parts such as an engine, an air cleaner and the like are supported on a vehicle body frame, a cabin space is formed by mounting a pair of left and right seats on the vehicle body frame with the engine being arranged below the seats. The air cleaner is arranged behind the engine with an intake duct for sucking outside air into the air cleaner. The intake duct extends frontwardly from the air cleaner while avoiding a cylinder portion of the engine with a distal end portion thereof being opened in a cabin space between the pair of left and right seats.

As an operation of the intake duct, by allowing the distal end portion of the intake duct to be opened in the cabin space, air in the inside of the cabin space is sucked from the distal end portion of the intake duct and is made to flow into the inside of the air cleaner. Air in the inside of the cabin space contains substantially no dust and is clean. Thus, a filter of the air cleaner is prevented from being clogged. Further, the intake duct extends from the air cleaner and is arranged behind the engine to the cabin space. Thus, a length of the intake duct of the present invention can be shortened compared to a length of a conventional intake duct which makes use of a vertically extending frame.

According to an embodiment of the present invention, the intake duct has an end surface of the distal end portion thereof and the lower surface of the distal end portion thereof that are opened.

As an operation of the intake duct, air is sucked into the inside of the duct from an opening formed in the end surface of the distal end portion and an opening formed in the lower surface of the distal end portion. Thus, an opening area of the intake duct is increased whereby the intake resistance is decreased. For example, when air is sucked from only the opening formed in the end surface of the distal end portion as compared to the present invention, the intake resistance is increased.

According to an embodiment of the present invention, the intake duct has a front portion thereof formed into the water stop structure.

As an operation of the water stop structure of the intake duct, for example, when the vehicle is immersed in water, due to the provision of the water stop structure, water is stopped at a front portion of the intake duct and hardly intrudes in the air cleaner side.

According to an embodiment of the present invention, the cabin space includes a louver therein.

As an operation of the louver, when the louver is arranged to face a distal end portion of the intake duct which is opened in the cabin space, air flows easily into the inside of the intake duct from the cabin space by way of the louver.

According to an embodiment of the present invention, the intake duct extends frontwardly from the air cleaner while avoiding the cylinder portion of the engine and the distal end portion thereof is opened in the cabin space between the pair of left and right seats. Thus, it is possible to suck clean air in the inside of the cabin space into the inside of the air cleaner.

Further, by extending the intake duct from the air cleaner arranged behind the engine and below the seat to the cabin space, the intake duct of the present invention can be shortened compared to the conventional intake duct. Thus, the intake resistance can be decreased thus enhancing the engine performance.

According to an embodiment of the present invention, the intake duct has the end surface of the distal end portion thereof and the lower surface of the distal end portion thereof opened. Thus, compared to a case wherein only the end surface of the distal end portion of the intake duct is opened, it is possible to further decrease the intake resistance thus further enhancing an output of the engine.

According to an embodiment of the present invention, the intake duct has the front portion thereof formed into the water stop structure. Thus, when the vehicle is immersed in water, it is possible to make it hard for water to enter the inside of the intake duct as well as the inside of the air cleaner.

According to an embodiment of the present invention, the cabin space includes the louver therein. Thus, it is possible to easily suck air from the distal end portion of the intake duct by way of the louver thus increasing the intake efficiency.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a best mode for carrying out the present invention is explained in conjunction with attached drawings. Wherein, the drawings are viewed in the direction of the symbols.

Figure 1:
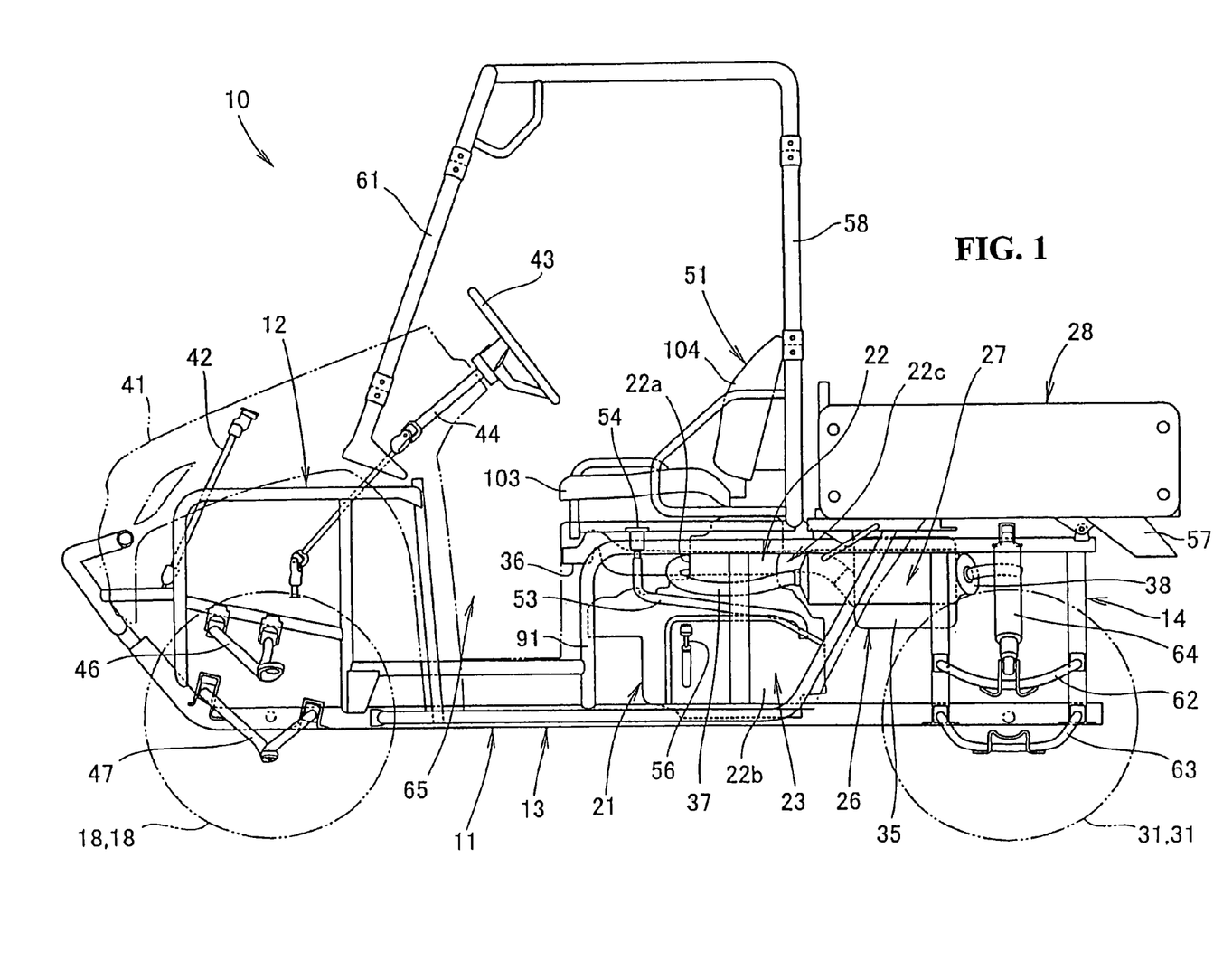
FIG. 1 is a side view of a vehicle which adopts an intake structure according to the present invention.

FIG. 1 is a side view of a vehicle that adopts an intake structure according to the present invention. The vehicle 10 is a two-seater four-wheel drive vehicle that includes a vehicle body frame 11 that includes a front frame 12, a center frame 13 and a rear frame 14 with left and right front wheels 18, 18. A power unit 21 includes an engine 22 and a transmission 23 which are mounted on the center frame 13 with an intake device 26 that is connected to an upper rear portion of the engine 22 for supplying air and fuel to the engine 22. An exhaust device 27 extends rearwardly from an upper front portion of the engine 22. A carrier 28 is mounted on an upper portion of the rear frame 14 in an inclinable manner. Left and right rear wheels 31, 31 are provided.

The intake device 26 includes a throttle body (not shown in the drawing) which is connected to a rear portion of a cylinder head 22a of the engine 22, an air cleaner 35 which is connected to the throttle body, and an intake duct 36 which extends frontwardly from the air cleaner 35.

The exhaust device 27 includes an exhaust pipe 37 which is connected to a front portion of the cylinder head 22a and extended rearwardly, and a muffler 38 which is connected to a rear end of the exhaust pipe 37.

A front cover 41 is provided together with a radiator 42, a handle 43 and a steering shaft 43. Upper arms 46 are provided for supporting the front wheel 18 and lower arms 47 for supporting the front wheels 18. Left and right seats 51, 52 (showing only reader's side indicated by symbol 51) are mounted on the center frame 13. An engine oil supply pipe 53 is mounted on a crank case 22b of the engine 22. A cap 54 is mounted on a distal end of the engine oil supply pipe 53. An oil level gauge 56 is mounted on a side portion of the crank case 22b. Rear fenders 57, 57, (showing only reader's side indicated by symbol 57) are provided with left and right roll rods 58, 58 (showing only reader's side indicated by symbol 58) being raised from the center frame 13. Upper frames 61, 61 (showing only reader's side indicated by symbol 61) extend between the front frame 12 and the roll rods 58, 58. An upper arm 62 is provided for supporting the rear wheel 31, 31. A lower arm 63 is provided for supporting the rear wheels 31, 31. Rear shock absorbers 64, 64, (showing only reader's side indicated by symbol 64) are provided. A cabin 65 for providing a space for crew members is arranged behind the upper frame 61 and in front of the roll rod 58.

Figure 2:
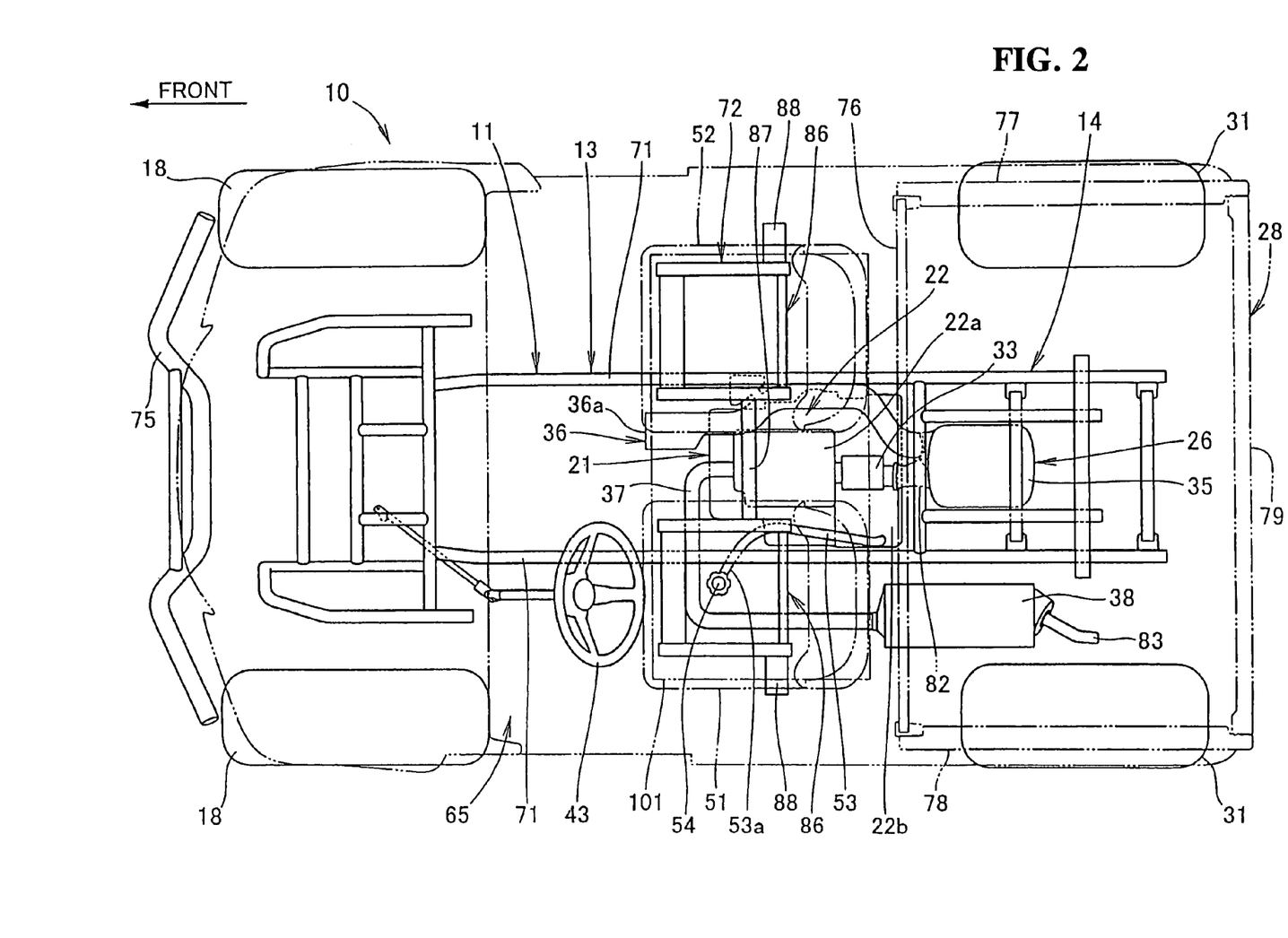
FIG. 2 is a plan view of the vehicle according to the present invention.

FIG. 2 is a plan view (an arrow (FRONT) in the drawing indicating a front portion of the vehicle) of a vehicle according to the present invention. In FIG. 2, a pair of left and right main frames 71, 71 is mounted on the center frame 13 and the rear frame 14 of the vehicle body frame 11, a seat frame member 72 is mounted on the main frames 71, 71 with left and right seats 51, 52 are mounted on the seat frame member 72. The power unit 21 and the intake device 26 are arranged between the left and right main frames 71, 71. A portion of the exhaust pipe 37, which extends from a front portion of the cylinder head 22a of the engine 22, and the muffler 38 are arranged outside of the left-side main frame 71. A bumper frame 75 is provided together with frame members 76 to 79 of the carrier 28.

The throttle body 33, which constitutes the intake device 26 is connected to a rear portion of the cylinder head 22a of the engine 22, and the air cleaner 35 are mounted on a rear end of the throttle body 33 by way of a connecting tube 82. The air cleaner 35 is positioned at approximately the center between the left and right main frames 71, 71.

The intake duct 36 extends in the frontward direction of the vehicle body in a state wherein the intake duct 36 is bent and extends to approach the right-side main frame 71 from a front portion of the air cleaner 35 and a right side of the connecting tube 82. Thereafter, the intake duct 36 extends along the main frame 71 with the intake duct 36 being bent away from the main frame 71 and extending frontwardly. A front end portion 36a of the intake duct 36 includes an opening which constitutes an intake port and the port is arranged at a position closer to an occupant's seat 52 than a driver's seat 51.

The exhaust pipe 37 of the exhaust device 27 extends first in the frontward direction of the vehicle body from a front portion of the cylinder head 22a and, then, extends in the left direction of the vehicle body and, further, extends rearwardly along the main frame 71 after intersecting the main frame 71, and is connected to the muffler 38. The muffler 38 also extends rearwardly along the main frame 71. A tail pipe 83, which is mounted on a rear end of the muffler 38 extends obliquely in the rearward and left direction from the muffler 38, and a rear end of the tail pipe 83 is directed rearwardly.

The engine oil supply pipe 53 extends in the substantially frontward direction of the vehicle body from the crankcase 22b and is arranged on a rear left corner portion of the power unit 21. The engine oil supply pipe 53 is gently bent in the left direction to traverse the main frame 71 and has a distal end portion 53a thereof and a cap portion 54 thereof positioned outside the main frame 71.

The seat frame member 72 includes seat frame members 86, 86 which are mounted on the main frames 71, 71 side for supporting the seats 51, 52, a connection frame 87 which connects the respective seat frame members 86, 86, and a side frame 88 which projects sideward from the respective seat frame members 86, 86.

FIG. 3 is a perspective view of an essential part of the vehicle according to the present invention. In FIG. 3, a front end of an upper portion of the power unit 21 is covered with a front panel 111, both sides of the upper portion of the power unit 21 are covered with side panels 112, 113, and a step floor 114 on which an occupant places his/her feet is contiguously formed with a lower portion of the front panel 111. Upper frames 91, 91 are respectively mounted on upper portions of the left and right main frames 71, 71 (see FIG. 2) for mounting the seat frame member 72 (see FIG. 2).

The front panel 111 has a plate-like brim portion 111a which extends rearwardly on an upper end thereof. A plurality of ventilation holes 111b, arranged close to the opening of the distal end portion of the intake duct 36, are formed in a front surface of the front panel 111.

More specifically, the intake duct 36 has the distal end portion thereof opened in the cabin space 65 by way of the plurality of ventilation holes 111b.

The side panels 112, 113 respectively include plate-like peripheral portions 112a, 113a which extend in the inward direction of the vehicle body on upper ends thereof. An inner cover (not shown in the drawing) for covering the power unit 21 from above is continuously arranged over the peripheral portions 112a, 113a and the peripheral portion 111a of the front panel 111.

Figure 4:
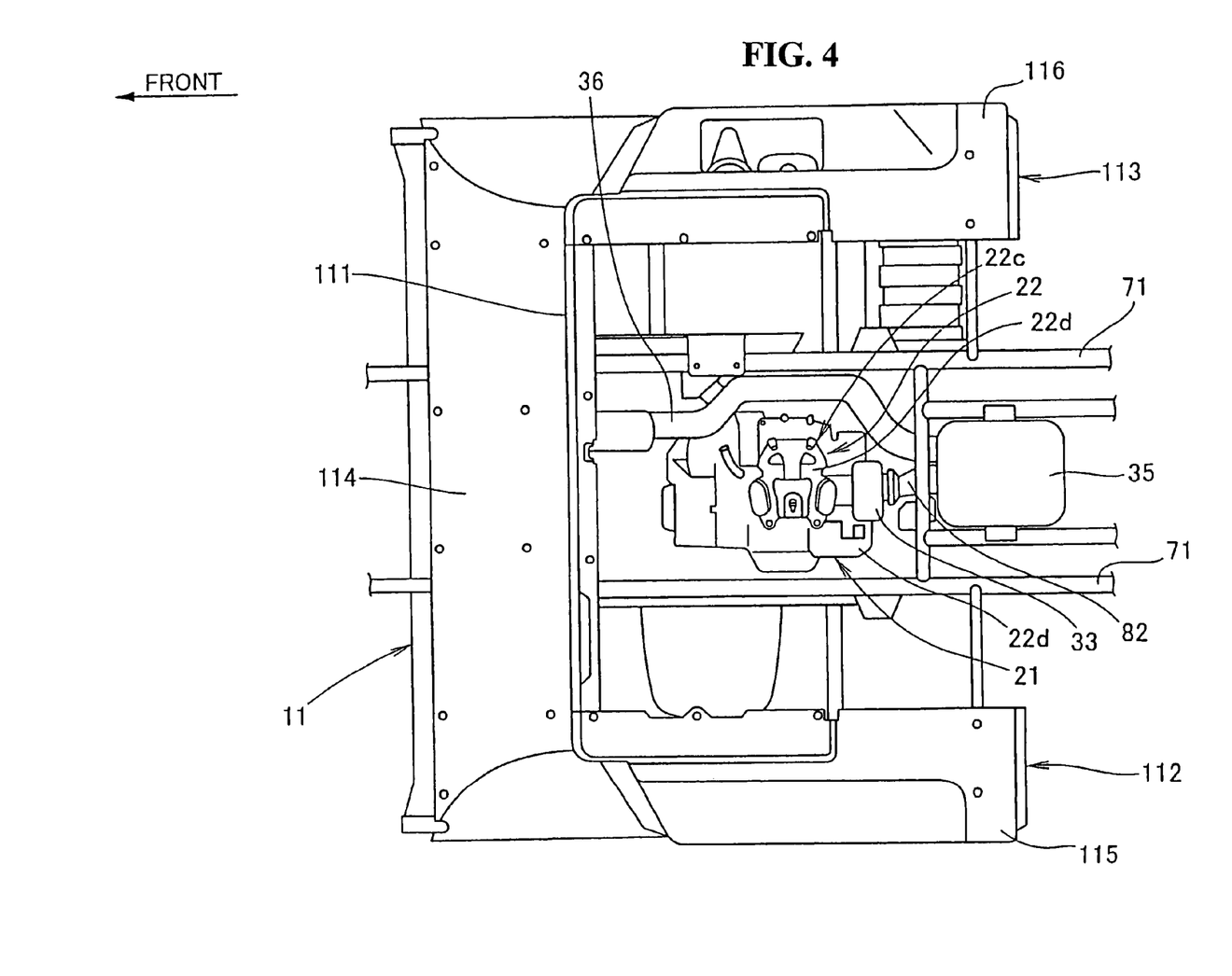
FIG. 4 is a plan view of an essential part of the vehicle according to the present invention.

FIG. 4 is a plan view of an essential part of the vehicle according to the present invention. In FIG. 4, side steps 115, 116 are respectively mounted on outer portions and rear portions of the side panels 112, 113, while an intake duct 36 extends in the frontward direction of the vehicle body from the air cleaner 35 such that the intake duct 36 avoids the cylinder portion 22c which projects upwardly from the engine 22.

The cylinder portion 22c includes a cylinder block (not shown in the drawing) which is mounted on the crankcase 22b, a cylinder head 22a (see FIG. 3) which is mounted on an upper portion of the cylinder block and a head cover 22d which is mounted on an upper portion of the cylinder head 22a.

Figure 5A:
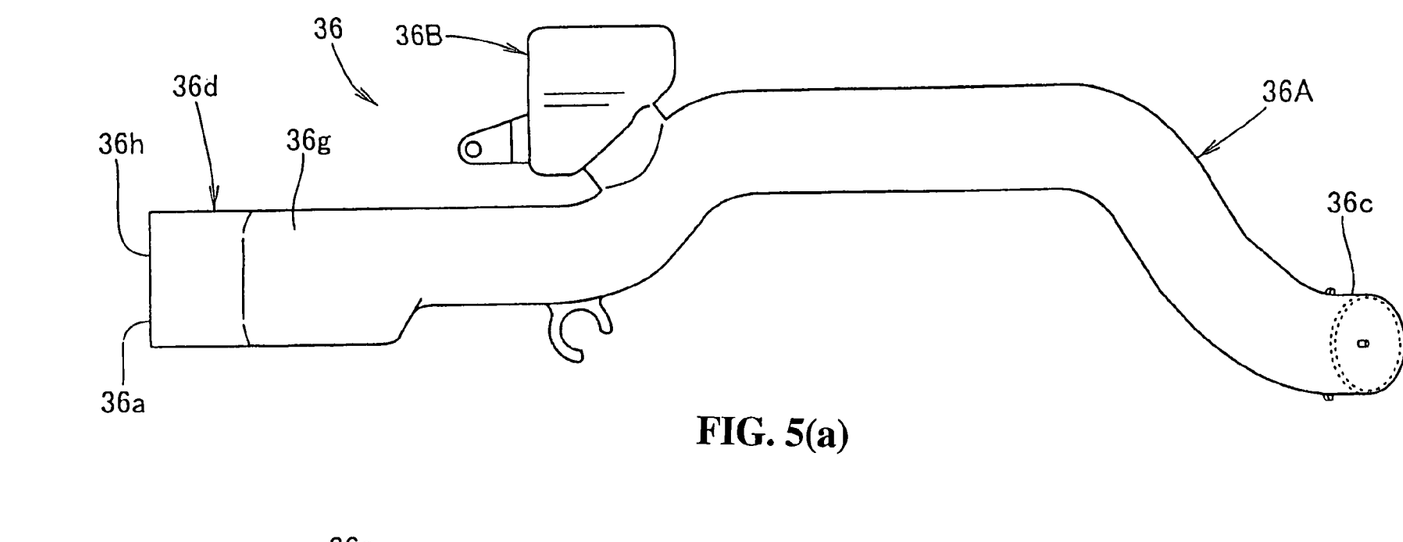
FIGS. 5(a) and 5(b) are explanatory views of an intake duct according to the present invention.
Figure 5B:
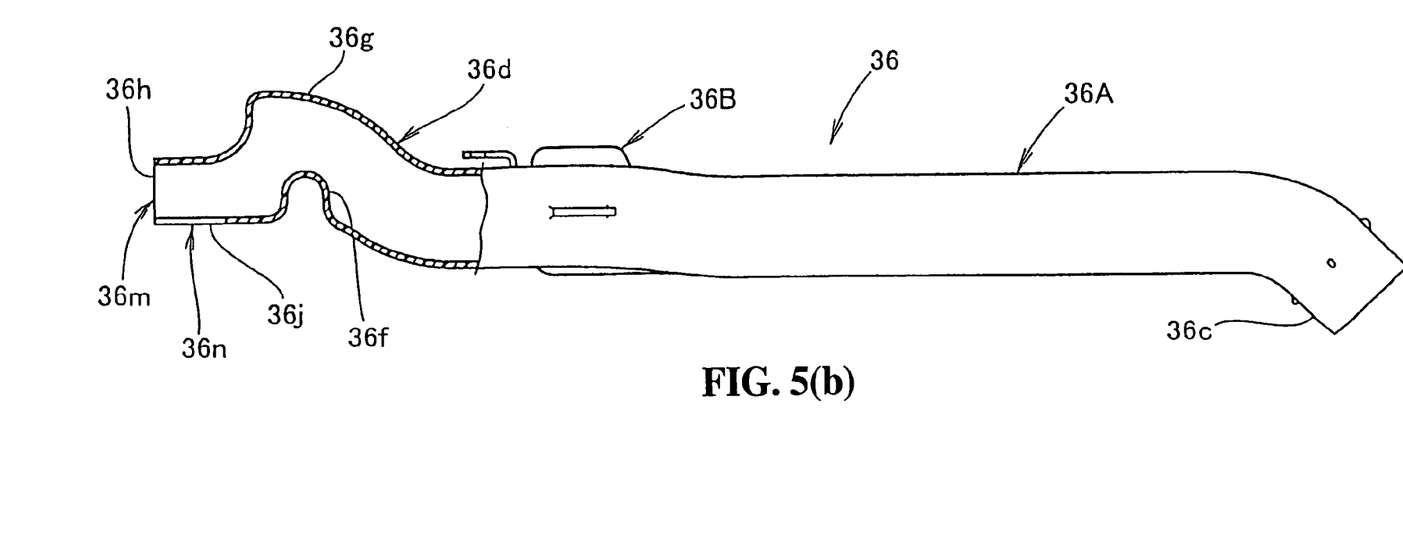

FIGS. 5(a) and 5(b) are explanatory views of the intake duct according to the present invention.

FIG. 5(a) is a plan view, wherein the intake duct 36 includes a pipe portion 36A and a resonator 36B which are mounted on a side surface of the pipe portion 36A for reducing intake sound. A rear portion 36c of the pipe portion 36A is connected to the air cleaner 35 (see FIG. 2), and a front portion 36d of the pipe portion 36A is formed into the water stop structure.

FIG. 5(b) is a side view (with a part cross section), wherein a front portion 36d of the intake duct 36 forms, as the water stop structure, a projecting wall 36f which projects upwardly in an inverse U-shape on a lower portion thereof. Along with the projection of the front portion 36d, an upper wall 36g is also curved upwardly. Further, a lower surface 36j is also opened along with the opening of an end surface 36h of the intake duct 36 thus forming opening portions 36m, 36n.

The manner of operation of the above-mentioned water stop structure of the intake duct 36 is hereinafter explained.

Figure 6B:
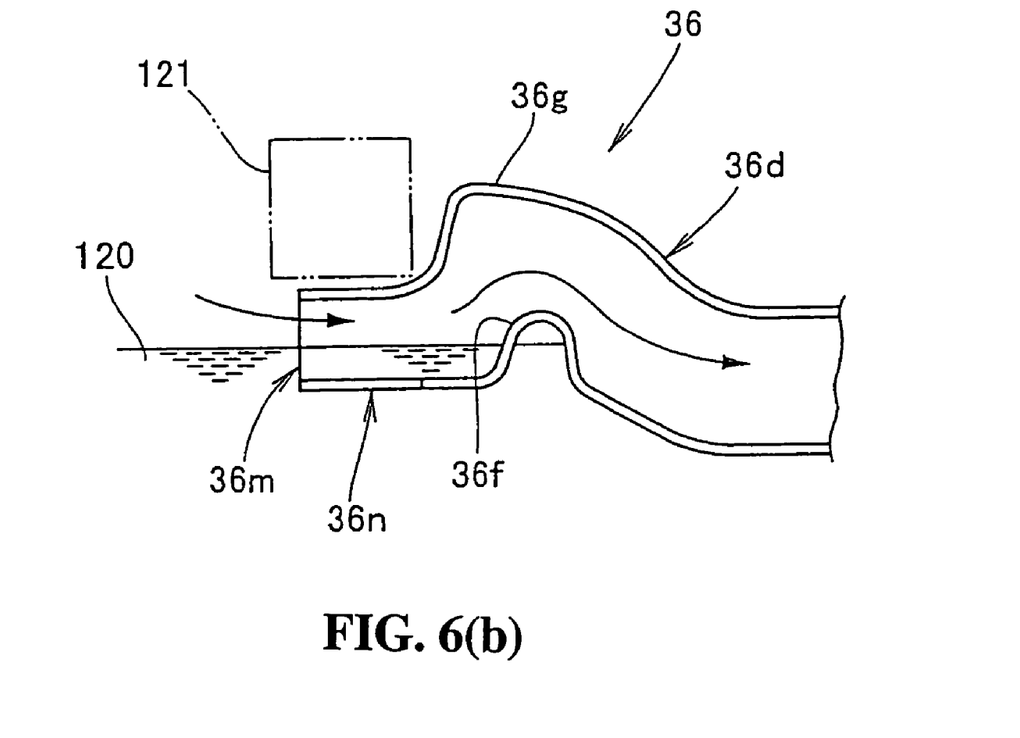

FIGS. 6(a) and 6(b) are operational views showing the operation of the water stop structure of the intake duct according to the present invention.

In FIG. 6(a), the intake duct 36 includes an opening 36m which is opened in the frontward direction of the vehicle and an opening 36n which is opened in the downward direction of the vehicle in the front portion 36d thereof. Accordingly, as indicated by arrows, air flows into the inside of the intake duct 36 from the opening 36m and the opening 36n and advances to the air cleaner side.

Accordingly, an opening area of an intake port is increased. Thus, the air resistance is decreased and it is possible to take a large quantity of air into the inside of the intake duct 36 at a time.

In FIG. 6(b), the intake duct 36 forms the projecting wall 36f which projects upwardly as the water stop structure on the front portion 36d thereof. Thus, even when a vehicle is flooded and is immersed in water 120 up to a position of the intake duct 36, it is possible to block the water 120 by the projecting wall 36f and to make it difficult for the water to enter the air cleaner side compared to a case in which no such projecting wall 36f is provided to the intake duct 36. Although it may be a possible to adopt a method which elevates the position of the opening portions 36m, 36n to prevent the inflow of water from the opening portions 36m, 36n, the water stop structure of the present invention is effectively applicable to a case in which an obstacle 121 is present in the vicinity of an upper wall 36g of the front portion 36d of the intake duct 36.

Figure 7:
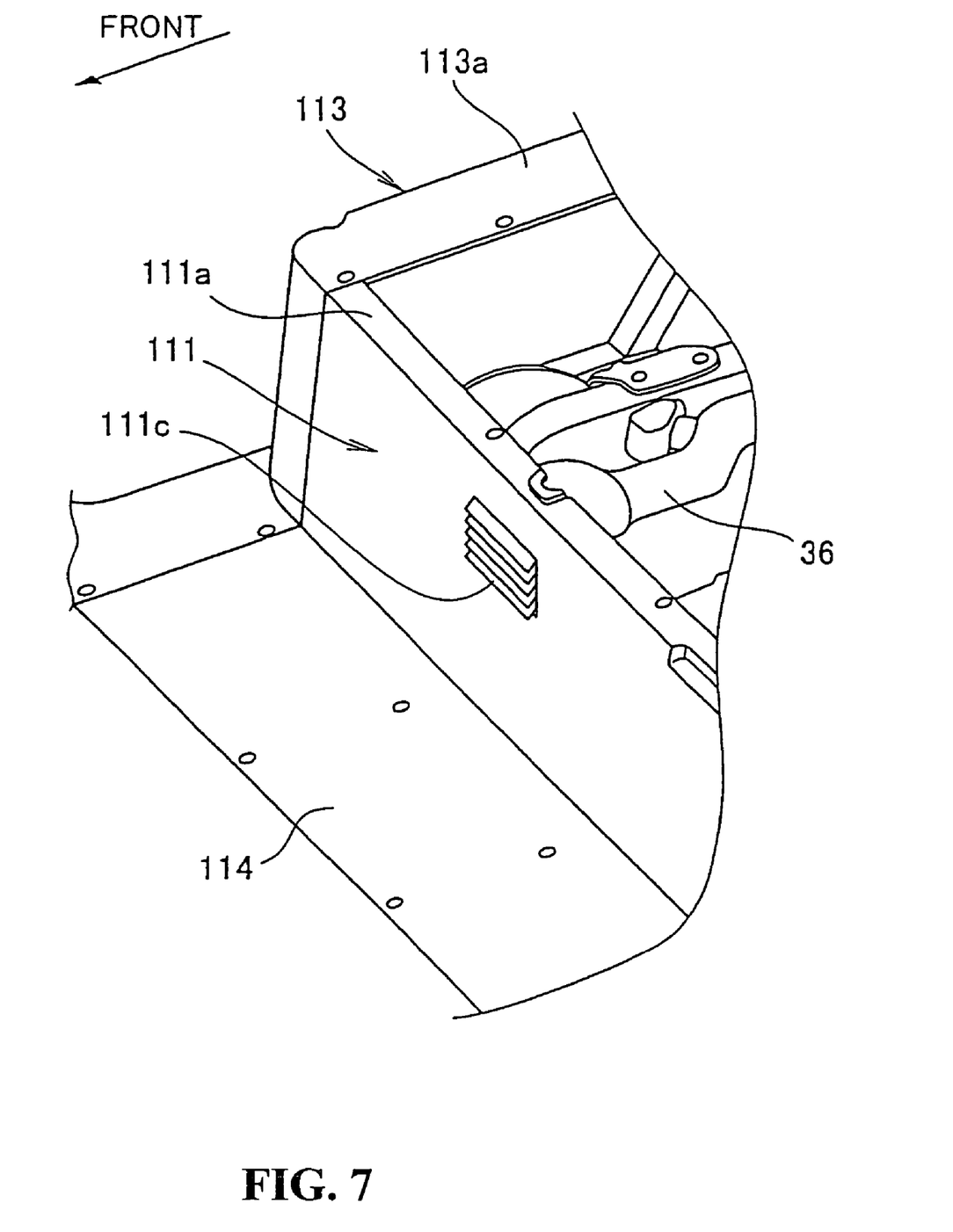
FIG. 7 is a perspective view of an essential part showing another embodiment of a front panel according to the present invention.

FIG. 7 is a perspective view of an essential part showing another embodiment of the front panel according to the present invention, wherein the front panel 111 forms a louver 111c on a front surface thereof in a state wherein the louver 111c is arranged close to an opening formed in a distal end portion of the intake duct 36. By allowing the distal end portion of the intake duct 36 to open in the cabin 65 (see FIG. 2) by way of the louver 111c, it is possible to smoothly take air inside of the cabin 65 into the intake duct 36 by way of the louver 111c thus reducing the intake resistance whereby the intake efficiency can be enhanced.

As shown in FIG. 1 and FIG. 3, the vehicle 10 includes vehicle body mounting parts such as the engine 22, the air cleaner 35 and the like that are supported on the vehicle body frame 11. The cabin 65 is formed by mounting a pair of left and right seats 51, 52 on the vehicle body frame 11 with the engine 22 being arranged below the seats 51, 52. The air cleaner 35 is arranged behind the engine 22 with the intake duct 36 for sucking outside air being connected to the air cleaner 35. The intake duct 36 extends frontwardly from the air cleaner 35 while avoiding the cylinder portion 22c mounted on the engine 22. The distal end portion 36a of the intake duct 36 is opened in the cabin 65 side between the pair of left and right seats 51, 52.

Due to such a constitution, it is possible to take clean air inside the cabin 65 into the inside of the air cleaner 35.

Further, by allowing the intake duct 36 to extend to the cabin 65 from the air cleaner 35 which is arranged behind the engine 22 below the seats 51, 52, it is possible to shorten the intake duct 36 compared to the conventional structure. Thus, it is possible to reduce the intake resistance whereby the engine performance can be enhanced.

As shown in FIGS. 5(a) and 5(b), the end surface 36h and the lower surface 36j of the distal end portion of the intake duct 36 are opened.

Due to such a constitution, compared to the structure in which only the end surface 36h of the distal end portion of the intake duct 36 is opened, the intake resistance can be further reduced whereby the engine output can be further enhanced.

In addition, the front portion 36d of the intake duct 36 adopts the water stoppage structure.

Since the projection wall 36f which projects upwardly is formed as the water stoppage structure on the front portion 36d of the intake duct 36, even when the vehicle is immersed in water, it is possible to make it difficult for water to enter inside the intake duct 36 or inside of the air cleaner 35.

As illustrated in FIGS. 1, 2 and 7, the louver 111c is formed on the front panel 111 which faces the cabin 65.

Due to such a constitution, it is possible to easily take air into the intake duct 36 from the front end portion 36a of the intake duct 36 by way of the louver 111c thus enhancing the intake efficiency.

As illustrated in FIG. 5(b), one projection wall 36f is formed as the water stop structure. However, the present invention is not limited to such a structure and a plurality of projection walls 36f may be formed. Due to such a constitution, it is possible to enhance the water stop effect.

The intake structure of the present invention is preferably applicable to a vehicle which arranges an air cleaner behind an engine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An intake structure of a vehicle, in which vehicle body mounting parts including an engine and an air cleaner are supported on a vehicle body frame with a cabin space being formed by mounting at least one seat on the vehicle body frame with the engine being arranged below the at least one seat and the air cleaner being arranged behind the engine and separated from the cabin space by a panel containing apertures comprising:
   an intake duct for the air cleaner which sucks outside air to the air cleaner;
   said intake duct extending frontwardly from the air cleaner while avoiding a cylinder portion of the engine, wherein said apertures provide communication between a distal end portion of the intake duct and the cabin space adjacent to the at least one seat.

2. The intake structure of a vehicle according to claim 1, wherein the intake duct includes an end surface of the distal end portion thereof and a lower surface of the distal end portion thereof opened.

3. The intake structure of a vehicle according to claim 2, wherein the water stop includes a projecting wall formed in front portion of said intake duct.

4. The intake structure of a vehicle according to claim 3, wherein the water stop includes an upper wall juxtaposed above the projecting wall for substantially maintaining an area of an opening of the intake duct across the projecting wall.

5. The intake structure of a vehicle according to claim 3, wherein an initial opening of the intake duct is of a predetermined area and an area of the intake duct downstream of the water stop is an increased area relative to the initial opening of the intake duct for decreasing air resistance.

6. The intake structure of a vehicle according to claim 3, wherein the projecting wall formed in the front portion of the intake duct forms a barrier for preventing water from entering a downstream area of the intake duct by forming the water stop.

7. The intake structure of a vehicle according to claim 1, wherein the intake duct has a front portion thereof formed into a water stop structure.

8. The intake structure of a vehicle according to claim 2, wherein the intake duct has a front portion thereof formed into a water stop structure.

9. The intake structure of a vehicle according to claim 1, wherein the apertures are defined by ventilation holes for enabling communication between the cabin space and the distal end of the intake duct.

10. The intake structure of a vehicle according to claim 1, wherein the apertures are defined by a louver for enabling communication between the cabin space and the distal end of the intake duct.

11. An intake structure adapted to be used with a vehicle wherein vehicle body mounting parts including an engine are supported on a vehicle body frame with a cabin space being formed by mounting at least one seat on the vehicle body frame with the engine being arranged below the at least one seat comprising:
   an air cleaner being arranged behind the engine and separated from the cabin space by a panel containing apertures, said air cleaner being provided with an intake duct for sucking outside air to the air cleaner;
   said intake duct extending frontwardly from the air cleaner while avoiding a cylinder portion of the engine, wherein said apertures provide communication between a distal end portion of said intake duct and the cabin space adjacent to the at least one seat.

12. The intake structure adapted to be used with a vehicle according to claim 11, wherein the intake duct includes an end surface of the distal end portion thereof and a lower surface of the distal end portion thereof opened.

13. The intake structure adapted to be used with a vehicle according to claim 12, wherein the water stop includes a projecting wall formed in front portion of said intake duct.

14. The intake structure adapted to be used with a vehicle according to claim 13, wherein the water stop includes an upper wall juxtaposed above the projecting wall for substantially maintaining an area of an opening of the intake duct across the projecting wall.

15. The intake structure adapted to be used with a vehicle according to claim 13, wherein an initial opening of the intake duct is of a predetermined area and an area of the intake duct downstream of the water stop is an increased area relative to the initial opening of the intake duct for decreasing air resistance.

16. The intake structure adapted to be used with a vehicle according to claim 13, wherein the projecting wall formed in the front portion of the intake duct forms a barrier for preventing water from entering a downstream area of the intake duct by forming the water stop.

17. The intake structure adapted to be used with a vehicle according to claim 11, wherein the intake duct has a front portion thereof formed into a water stop structure.

18. The intake structure adapted to be used with a vehicle according to claim 12, wherein the intake duct has a front portion thereof formed into a water stop structure.

19. The intake structure adapted to be used with a vehicle according to claim 11, wherein the apertures are defined by ventilation holes for enabling communication between the cabin space and the distal end of the intake duct.

20. The intake structure adapted to be used with a vehicle according to claim 11, wherein the apertures are defined by a louver for enabling communication between the cabin space and the distal end of the intake duct.

* * * * *